(12) United States Patent
Al-Jlil

(10) Patent No.: US 8,394,739 B2
(45) Date of Patent: Mar. 12, 2013

(54) ADSORBENT FOR ADSORPTION OF HEAVY METALS IN WASTE WATER

(75) Inventor: Saad A. Al-Jlil, Riyadh (SA)

(73) Assignee: Technology Development Center, King Abdulaziz City for Science and Technology, Riyadh (SA)

( * ) Notice: Subject to any disclaimer, the term of this patent is extended or adjusted under 35 U.S.C. 154(b) by 377 days.

(21) Appl. No.: 12/835,888

(22) Filed: Jul. 14, 2010

(65) Prior Publication Data

US 2012/0012531 A1 Jan. 19, 2012

(51) Int. Cl.
*B01J 20/00* (2006.01)
(52) U.S. Cl. .......................................... 502/407; 210/688
(58) Field of Classification Search .................. 502/407; 210/688
See application file for complete search history.

(56) References Cited

U.S. PATENT DOCUMENTS

| 4,133,755 | A | 1/1979 | Tarao et al. |
| 5,256,615 | A | 10/1993 | Oomura et al. |
| 5,667,694 | A | 9/1997 | Cody et al. |
| 2009/0258326 | A1 * | 10/2009 | Al-Sulaiman et al. ........ 433/163 |

FOREIGN PATENT DOCUMENTS

WO 00/72958 12/2000

* cited by examiner

*Primary Examiner* — Chester Barry
(74) *Attorney, Agent, or Firm* — Andrew M. Calderon; Roberts Mlotkowski Safran & Cole, P.C.

(57) ABSTRACT

A method and adsorbent composition for removing heavy metals from contaminated water, including mixing a water having a concentration of one or more heavy metals with an adsorbent including granules of a mixture of 3.33 wt % bentonite clay and a siwak stick powder; and collecting water having a reduced concentration of the heavy metal(s).

5 Claims, 1 Drawing Sheet

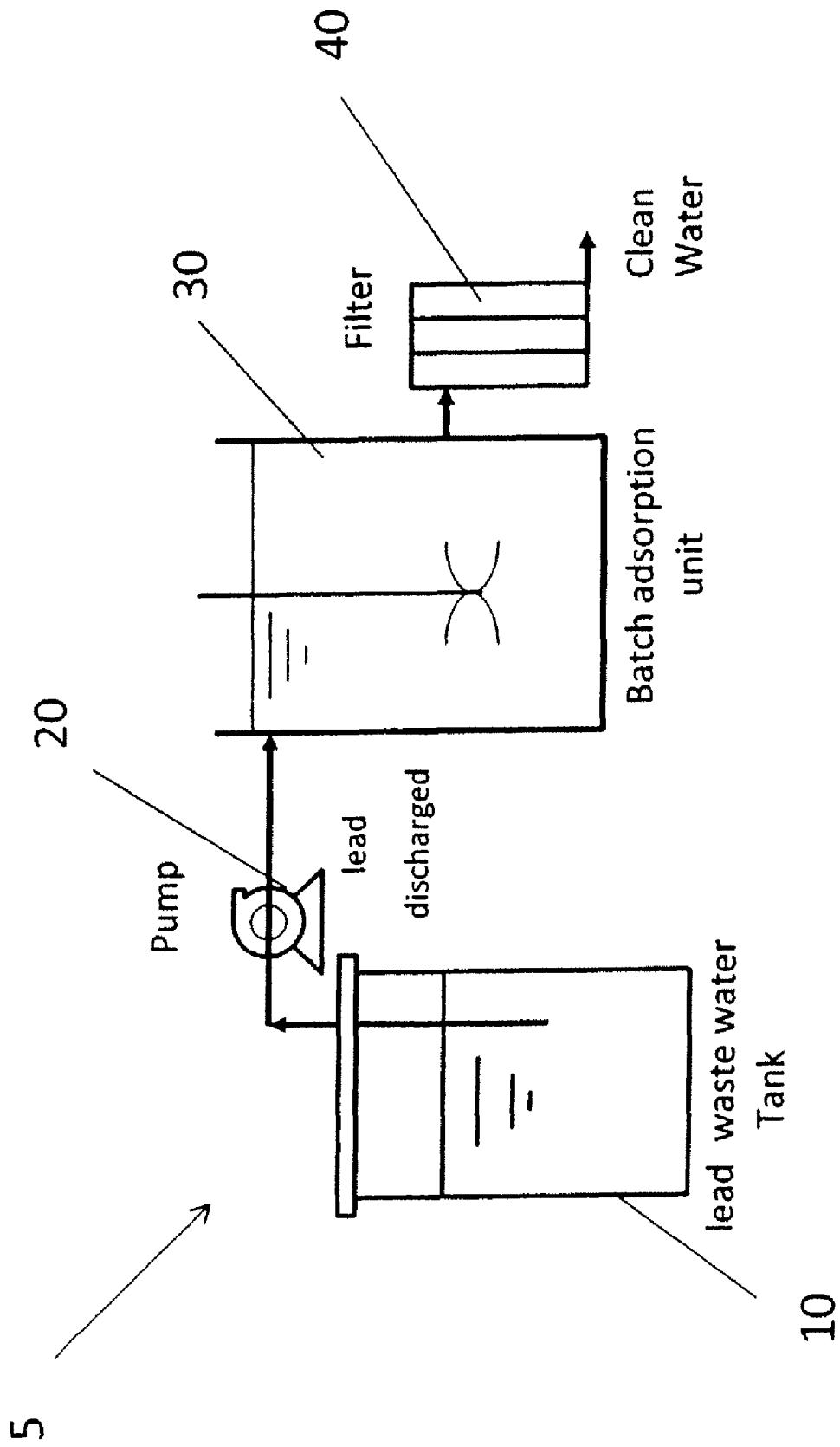

ADSORBENT FOR ADSORPTION OF HEAVY METALS IN WASTE WATER

FIELD OF THE INVENTION

The invention relates to an adsorbent for removing heavy metals from contaminated water, and more particularly, to a process for decontaminating a heavy metal contaminated stream of water.

BACKGROUND OF THE INVENTION

In the area of water treatment, such as ground water or industrial waste water treatment, there is an ever-increasing need to remove undesirable and even toxic contaminants, particularly heavy metal contaminants, from water. Many industrial processes utilize aqueous solutions of heavy metals, such as lead in the manufacture of batteries, and chromium or copper in electroplating solutions.

Unfortunately, the removal of such heavy metals from the aqueous solutions used in these processes has proven to be not only difficult but expensive. Prior art processes have utilized different types of adsorbents, such as activated carbon, activated sludge, various types of natural clays, carbon aerogels, coirpith carbon, natural zeolites and even date pits. Likewise, heavy metal removal can be accomplished through expensive ion exchange resins.

U.S. Pat. No. 4,133,755 to Tarao et al., incorporated by reference herein in its entirety, discloses agents for removing heavy metals comprising a composition consisting mainly of a dithiocarbamate bond-containing low molecular weight compound, amorphous silica and activated carbon powder, granulated with a vinyl acetate polymer binder and clay as a thixotropic excipient. Tarao et al. disclose packing the granulated materials into columns for treating mercury-contaminated waste water.

U.S. Pat. No. 5,667,694 to Cody et al., incorporated by reference herein in its entirety, discloses a process for removing dissolved heavy metals including lead and radioactive contaminants from contaminated aqueous systems including aqueous soil systems. An organically modified smectite clay, or organoclay, is used to treat these systems. Organoclays are the reaction product of smectite clays and quaternary ammonium compounds. The organoclay is brought in contact with system to be treated where it sorbs the heavy metal in the aqueous system onto the organoclay which sorbed complex is then removed by a variety of methods including flotation and air sparging.

U.S. Pat. No. 5,256,615 to Oomura et al., incorporated by reference herein, discloses a granular inorganic ion exchanger which is obtained by firing at 400° C. or higher a granular molded product of a mixture of a metal alkoxide such as $Si(OMe)_4$ or hydrolyzate thereof, a clay mineral such as sepiolite and an inorganic ion exchanger such as antimony pentoxide and which has mechanical strength and heat resistance without losing its inherent ion exchangeability.

World Patent Publication No. WO 00/72958 to Payzant et al., incorporated by reference herein in its entirety, discloses a networked polymer/clay alloy produced from a monomer/clay mixture comprising a monomer, a cross-linking agent and clay particles. The clay is chemically integrated with the polymer such that, on exposure to water, the networked polymer/clay alloy swells with substantially no clay separating from the alloy.

However, none of the above-discussed references discloses or suggests a relatively inexpensive but highly effective adsorbent composition for removal of heavy metal contaminants from contaminated water streams. Accordingly, there exists a need in the art to overcome the deficiencies and limitations described hereinabove.

SUMMARY OF THE INVENTION

In accordance with aspects of the invention, the invention is directed to an adsorbent composition for metal ions, comprising a granulated mixture of 3.33 wt % Saudi bentonite clay and a 63.33 wt % Saudi siwak stick powder.

In accordance with aspects of the invention, the invention is directed to a method for removing heavy metals from contaminated water, comprising mixing a water having a concentration of one or more heavy metals with an adsorbent composition comprising granules of a mixture of 3.33 wt % bentonite clay and a 63.33 wt % Saudi siwak stick powder; and collecting water having a reduced concentration of the heavy metal(s).

In aspects of the invention, an adsorbent composition for metal ions is provided, comprising a granulated mixture of 3.33 wt % clay and a siwak stick powder. The clay has ion-exchange capacity. The clay is bentonite clay. Providing about 33.3 wt % of a triethylamine (TEA). The size range from about 0.125 mm to about 0.25 mm.

In aspects of the invention, a method is provided for removing heavy metals from contaminated water. The method comprises mixing a water having a concentration of one or more heavy metals with an adsorbent composition comprising granules of a mixture of 3.33 wt % bentonite clay and a siwak stick powder. The method further comprises collecting water having a reduced concentration of the one or more heavy metals. The process is conducted at a pH>4. The mixing step is conducted at a pH between about 4 and 5. The adsorbent composition is a mixture of about 3.33 wt % clay in a siwak stick powder. The one or more heavy metals is selected from the group consisting of lead, chromium, copper, zinc, cadmium and combinations thereof. A concentration of the one or more heavy metals in the water is between about 50 ppm and about 900 ppm. The one or more heavy metals is lead, and the concentration of lead in the water is reduced by at least about 70%.

BRIEF DESCRIPTION OF THE DRAWINGS

The present invention is described in the detailed description which follows, in reference to the noted plurality of drawings by way of non-limiting examples of exemplary embodiments of the present invention.

The FIGURE shows the adsorption system including a batch adsorption unit for removing heavy metals from contaminated waste water in accordance with aspects of the invention.

DETAILED DESCRIPTION OF THE INVENTION

The invention relates to an adsorbent composition for removing heavy metals from contaminated water, and more particularly, to a process for decontaminating a heavy metal contaminated stream of water.

The FIGURE shows the adsorption system including a batch adsorption unit for removing heavy metals from contaminated waste water in accordance with aspects of the invention. In particular, the adsorption system 5 includes a wastewater tank 10. The wastewater tank 10 can include heavy metals as discussed below. A pump 20 pumps the wastewater in the wastewater tank 10 to a batch absorption unit 30. As discussed in detail below, the heavy metals in the wastewater will be removed in the batch absorption unit 30. Prior to use, the remaining water will be filtered by a filter 40.

The filter 40 can be any well known filter used to remove heavy metals such as, for example, wastewater ion exchange filters.

*Salvadora persica* is a tree from which siwak stick is made from its twig/root and is commonly known as Arak tree. This tree is naturally growing in Jazan, Saudi Arabia. Siwak in the form of stick was crushed and milled to a particle size below 125 mesh (particles sized between about 0.125 mm to 0.25 mm). Then, siwak stick powder was used to remove heavy metals from waste water. The aim of this research was to find out the naturally available and low cost material for the treatment of waste water. There was no previous study carried out to use siwak stick powder as adsorbent for adsorption of metal ions from wastewater. Siwak stick has an inherent ion-exchange capacity at the pH range (3-5) where our experiment is performed. For example, siwak stick contains many functional groups (as found by FT-IR, Table 1) such as carboxylic groups. Since the solution pH affects the charge on the functional groups, therefore functional groups such as carboxylate are protonated at low pH values (In "Equilibrium Study of Adsorption of Cobalt ions from Wastewater using Saudi Roasted Date Pits" *Research Journal of Environmental Toxicology*, 1:12 (2010), by S. A. Al-Jlil). As the pH increased, deprotonation of the functional groups might have occurred and become available for metal ion binding. The metal ions has attraction force with the negative charge on the functional groups of siwak stick powder, such as carboxylate at alkaline solution when the pH of solution was high. Therefore, in the pH range (3-5) where experiments for the invention were performed, the electrostatic forces between the metal ions and the functional groups are not present and the metal ions can exchange with the proton of the functional groups by an ion exchange process. Some main functional groups in Saudi siwak stick powder are provided in Table 1. The surface area and pore characteristics of the siwak stick powder as an adsorbent are given in Table 2 and chemical analysis by XRF is given in Table 3.

TABLE 1

Main functional groups in Saudi siwak stick powder

| Observed band (cm$^{-1}$) | Functional group |
|---|---|
| 3488-3100 | O—H |
|  | N—H |
| 2800-2900 | C—H |
| 1600-1740 | C═O |
|  | Carbonyl |
| 1000-1200 | C—O |

TABLE 2

Surface area and pore characteristics of Saudi siwak stick powder

| Element | siwak stick powder |
|---|---|
| BET surface area (m$^2$/g) | 0.6933 |
| Pore volume (p/po = 0.97) (cm$^3$/g) | 0.001788 |
| Average pore width (Å) | 103.144 |

TABLE 3

Chemical analysis of Saudi siwak stick powder by XRF

| Element | Composition (%) |
|---|---|
| S | 23.0752 |
| Cl | 11.195 |
| K | 10.02 |
| Ca | 55 |
| Fe | 0.492 |
| Zn | 0.108 |
| Br | 0.0998 |

Naturally occurring clay has been known for use in treating water contaminated with heavy metals, since some such clays have an inherent ion-exchange capacity. For example, clay minerals have been found to be in the form of layered molecular structures, often having variable amounts of iron, magnesium, alkali metals, alkaline earths and other such cations sandwiched between the layers, which cations can exchange with heavy metal cations in aqueous solution.

In "Saudi Arabian clays for lead removal in wastewater", *Applied Clay Science*, 42:671-674 (2009), by S. A. Al-Juil and F. D. Alsewailem, incorporated by reference herein in its entirety, several naturally occurring Saudi Arabian clay materials were tested for lead adsorption efficiency from wastewater in batch processes. In some experiments, pretreatment of the clay with hydrochloric acid was found to increase lead adsorption efficiency, while other clays performed better in the absence of pretreatment. Additionally, adsorption efficiency was demonstrated to increase with increasing pH of the lead-contaminated water solution.

Therefore, clays can be used to enhance the adsorption capacity and removal efficiency of natural material such as our new material siwak stick powder. As such, bentonite clay has typically been added in only 3.33 wt %, since the adsorption capacity of siwak stick powder was approximately 20.35 mg/g. So, by adding bentonite clay, the overall efficiency in heavy metal removal from the process stream was increased (up to 70.1%).

In an effort to increase the siwak stick powder capacity as adsorbent for adsorption of heavy metals from waste water, the research leading to the present invention has discovered a new adsorbent composition for heavy metal ions which are dissolved in aqueous media and better adsorption capacity and removal efficiency than siwak stick powder alone. The enhancement of adsorption capacity by preparing the siwak stick/clay composite is 33.15% as compare to siwak stick powder alone and the enhancement in removal efficiency is 16.2%. In addition to the surface area and pore volume as shown in the below Table:

| Type | Maximum capacity (mg/g) | Removal efficiency (%) | BET surface area (m$^2$/g) | Enhancement of adsorption capacity % by preparing composite | Enhancement in removal efficiency % by preparing composite | Enhancement in surface area % | Enhancement in pore volume % | Enhancement in average pore width % |
|---|---|---|---|---|---|---|---|---|
| siwak stick powder | 20.35 | 58.81 | 0.6933 | 33.15 | 16.11 | 86.3 | 87.8 | 10.96 |

| Type | Maximum capacity (mg/g) | Removal efficiency (%) | BET surface area (m²/g) | Enhancement of adsorption capacity % by preparing composite | Enhancement in removal efficiency % by preparing composite | Enhancement in surface area % | Enhancement in pore volume % | Enhancement in average pore width % |
|---|---|---|---|---|---|---|---|---|
| siwak stick - bentonite clay composite | 30.44 | 70.1 | 5.0515 | | | | | |

In embodiments, an adsorbent composition for metal ions is disclosed comprising a granulated mixture of 3.33 wt % bentonite clay and a siwak stick powder.

In order to enhance such excellent combination of clay particles within the siwak stick powder, it can be advantageous to incorporate between about 33.3 wt % a triethylamine (TEA), with the clay and siwak stick powder upon mixing.

One manner of making the new adsorbent composition is to mill clay to a size below about 125 mesh and wash the clay particles with distilled water several times to remove impurities. The clay is then dried in a vacuum oven, e.g., overnight. The dried clay is composited with siwak stick powder, triethylamine, the blended is placed in an autoclave and then heated in an oven at a temperature about 200° C., even above 300° C., or even above 400° C. to make a paste. The paste is collected after 24 hours, dried and subsequently ground to granules of different sieve sizes, ranging for example from about 0.125 mm to about 0.25 mm.

The granulated adsorbent composition is then used as adsorbent for the removal of heavy metal ions, such as Cu, Cr and Pb, from industrial wastewater to obtain clean water for the development of landscape and industrial cooling. It has been observed that the adsorption capacity was enhanced by more than 70%, which is much less expensive as compared to other conventional technologies used for wastewater treatment for the removal of heavy metals.

The removal method can be enhanced by mixing the heavy-metal contaminated water with adsorbent composition. In embodiments, the solution being treated is maintained at a pH=4.5, and is treated for at least about 30 minutes at a room temperature or above.

The removal method, in embodiments, utilizes clay particles which have a naturally-occurring ion-exchange capacity, such as a bentonite clay. The removal method is effective in removing heavy metals including lead, chromium, copper, zinc, cadmium and combinations thereof. It has been found that when the heavy metal is lead the concentration of lead in the water is reduced by more than about 70%.

EXAMPLE 1

Saudi siwak in the form of stick was crushed and milled to a particle size below 125 mesh (particles sized between about 0.125 mm to 0.25 mm), washed with distilled water several times and dried in a vacuum oven over night. 0.25 gram of adsorbent particles were mixed in the batch absorption unit 30 as shown in the FIGURE, then 692.24 ppm Pb solution was mixed at 250 RPM with the adsorbent at 25° C. temperature. The samples were collected after thirty minutes. The lead content of the water was tested by atomic absorption spec troscopy and determined to be less than 285.17 ppm, the removal efficiency being greater than 58.81%.

EXAMPLE 2

Bentonite clay in the form of soft rocks was received and milled to a particle size below 125 mesh, washed with distilled water several times and dried in a vacuum oven over night. The dried clay particles were then dry blended with siwak stick powder (63.33%) and triethylamine at concentrations of about 3.33 wt % clay particles and about 33.3 wt % triethylamine. The mixture was then put in an autoclave, then put in an oven at a temperature of about 200° C. to make a paste. The paste was dried, ground into particles sized between about 0.125 mm to 0.25 mm. 0.25 gram of adsorbent particles were mixed in the batch absorption unit 30 as shown in the FIGURE, then 869 ppm Pb solution was mixed at 250 RPM with the adsorbent at 25° C. temperature. The samples were collected after thirty minutes. The lead content of the water was tested by atomic absorption spectroscopy and determined to be less than 260 ppm, the removal efficiency being greater than 70%.

EXAMPLE 3

The dried clay particles of Example 2 were dry blended with siwak stick powder particles 63.33 wt % and triethylamine at concentrations of about 3.33 wt % clay particles and about 33.3 wt % triethylamine, relative to the weight of the entire composition. The mixture was then put in an autoclave then heated in the oven at a temperature of about 200° C. The paste collected was dried, ground into particles sized between about 0.125 mm to 0.25 mm. 0.25 grams of adsorbent particles were combined with 12.5 mL water contaminated with 869 ppm Pb, and stirred in a batch process for about 30 minutes at a 25° C. temperature. After stirring was complete, the lead content of the water was tested and determined to be less than 260 ppm, the removal efficiency being greater than about 70%.

The foregoing examples have been provided for the purpose of explanation and should not be construed as limiting the present invention. While the present invention has been described with reference to an exemplary embodiment, changes may be made within the purview of the appended claims, without departing from the scope and spirit of the present invention in its aspects. Also, although the present invention has been described herein with reference to particular materials and embodiments, the present invention is not intended to be limited to the particulars disclosed herein; rather, the present invention extends to all functionally equivalent structures, methods and uses, such as are within the scope of the appended claims.

What is claimed:

1. An adsorbent composition for metal ions, comprising a granulated mixture of 3.33 wt % clay and a siwak stick powder.

2. The adsorbent composition of claim 1, wherein the clay has ion-exchange capacity.

3. The adsorbent composition of claim 1, wherein the clay is bentonite clay.

4. The adsorbent composition of claim 1, further comprising providing about 33.3 wt % of a triethylamine (TEA).

5. The adsorbent composition of claim 1, wherein the granulated mixture comprises granules in the size range from about 0.125 mm to about 0.25 mm.

* * * * *